(12) United States Patent
Valderrabano Berrones et al.

(10) Patent No.: US 9,297,974 B2
(45) Date of Patent: Mar. 29, 2016

(54) STRAIN RELIEF FOR PIGTAIL MODULE

(71) Applicant: CORNING OPTICAL COMMUNICATIONS LLC, Hickory, NC (US)

(72) Inventors: Roberto Valderrabano Berrones, Tamaulipas (MX); Cesar Alejandro de los Santos Campos, Tamaulipas (MX); Terry Lee Cooke, Hickory, NC (US); Marco Antonio Gonzalez Garcia, Reynosa (MX); Enrique Miguel Herrera de Hoyos, Tamaulipas (MX); Santos Ramiro Benavides Padron, Tamaulipas (MX)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/259,684

(22) Filed: Apr. 23, 2014

(65) Prior Publication Data
US 2014/0233903 A1    Aug. 21, 2014

Related U.S. Application Data

(63) Continuation of application No. PCT/US2012/061537, filed on Oct. 24, 2012.

(60) Provisional application No. 61/553,852, filed on Oct. 31, 2011.

(51) Int. Cl.
*G02B 6/44* (2006.01)
*G02B 6/38* (2006.01)

(52) U.S. Cl.
CPC ............ *G02B 6/4429* (2013.01); *G02B 6/3887* (2013.01); *G02B 6/443* (2013.01); *G02B 6/4472* (2013.01); *G02B 6/4476* (2013.01); *G02B 6/4471* (2013.01); *G02B 6/4477* (2013.01); *Y10T 29/49826* (2015.01); *Y10T 29/49865* (2015.01)

(58) Field of Classification Search
CPC .. G02B 6/4478; G02B 6/4477; G02B 6/4479; G02B 6/4472
See application file for complete search history.

(56) References Cited

U.S. PATENT DOCUMENTS

| | | | |
|---|---|---|---|
| 4,626,067 A | 12/1986 | Watson | |
| 5,185,840 A | 2/1993 | Iapicco | |
| 5,199,095 A | 3/1993 | Iapicco | |
| 2005/0163448 A1 | 7/2005 | Blackwell, Jr. et al. | |

(Continued)

OTHER PUBLICATIONS

Patent Cooperation Treaty, International Search Report for Application No. PCT/US2012/061537, mail date Jan. 24, 2013, 4 pages.

*Primary Examiner* — Jerry Rahll (57) ABSTRACT

Fiber optic modules having pigtails and related strain relief constructions for the fiber optic harness are disclosed. The fiber optic module assembly has a fiber pigtail exiting module, the assembly includes a main body of the module defining an internal chamber disposed between a first side and a second side, a plurality of fiber optic components disposed at the first side of the module, and a fiber optic harness including the fiber pigtail. The fiber optic harness includes a plurality of optical fibers within a portion of a protective tube on the pigtail portion and a strain-relief assembly for inhibiting movement between the optical fibers and protective tube. Consequently, the strain-relief assembly secures the plurality of optical fibers and the protective tube to the main body of the module.

14 Claims, 4 Drawing Sheets

(56) References Cited

U.S. PATENT DOCUMENTS

2005/0276551 A1 12/2005 Brown et al.
2006/0088250 A1 4/2006 Pimpinella et al.
2010/0027955 A1 2/2010 Parikh et al.
2010/0098386 A1* 4/2010 Kleeberger .................. 385/100
2010/0209057 A1 8/2010 Drouard

* cited by examiner

STRAIN RELIEF FOR PIGTAIL MODULE

RELATED APPLICATIONS

This application is a continuation of International Application No. PCT/US12/61537 filed on Oct. 24, 2012, which claims the benefit of priority to Provisional Application No. 61/553,852 filed on Oct. 31, 2011, both applications being incorporated herein by reference in their entirety.

BACKGROUND

The disclosure is directed to fiber optic modules such as used in data centers. More specifically, the disclosure is directed to fiber optic modules having a pigtail connection and strain relief concepts for the optical fibers exiting the fiber optic module.

Optical fiber is increasingly being used for a variety of applications, including but not limited to broadband voice, video, and data transmission. Optical networks typically include patch panels (i.e., arrays of connectors) connected by jumper cable assemblies. The patch panels such as equipment racks or the like provide a common location where moves, adds, or changes to connectivity of the channels of the optical network can be made by changing the ports for the jumper cable assemblies. Typically, the patch panels have the optical fibers connections in housing or shelf mounted in an equipment rack with a plurality of modules mounted in the housing or shelf.

By way of example, conventional fiber optic modules have a plurality of single or duplex fiber optic connectors on a front side of the module and one or more multi-fiber connectors located on the rear side of the module. Consequently, the craft can quickly make individual moves, adds or changes using jumpers plugged into the fiber optic connectors at the front side of the module and likewise make moves, adds or changes that the rear side of the module by plugging one or more optical connectors into the modules. In other variations, fiber optic modules may have a fiber optic pigtail that extends from the rear side of the module for fusion-splicing with optical fibers of the network, instead of a connector at the rear side of the module, thereby eliminating a connection point in the optical network and the associated optical insertion loss. The fiber optic pigtail that extends from the module may experience pulling forces or the like during installation that can be transferred into the fiber optic module. Thus, there is an unresolved need for inhibiting the transfer of pulling forces on the pigtail to the ends of the optical fibers attached to the fiber optic connectors inside the fiber optic module.

SUMMARY

The disclosure is directed to fiber optic modules having a fiber pigtail exiting the module and related strain relief constructions for the fiber optic harness. Simply stated, the strain relief constructions disclosed herein include a strain-relief assembly that is attached to the module for inhibiting pulling forces from being transferred into the module and causing performance issues. One embodiment of the disclosure is directed to a fiber optic module assembly having a fiber pigtail exiting module where the module includes a main body defining an internal chamber disposed between a first side and a second side of the module with a plurality of fiber optic components such as fiber optic connectors/adapters disposed at the first side of the module. The module also includes a fiber optic harness having the fiber pigtail with a plurality of optical fibers that exit the module for splicing to the optical network. A portion of optical fibers of the fiber pigtail are disposed within a portion of a protective tube and includes a strain-relief assembly for attachment to the module for inhibiting pulling forces from being transferred into the module. The plurality of optical fibers of the fiber pigtail exit the second side of the main body of the module and the strain-relief assembly is used for securing the plurality of optical fibers and the protective tube to the main body of the module, thereby providing strain-relief for the optical fibers of the fiber pigtail.

Another embodiment of the disclosure is directed to a fiber optic module having a fiber pigtail exiting the module where the module includes a main body defining an internal chamber disposed between a first side and a second side and a plurality of fiber optic components such as fiber optic connectors/adapters disposed at the first side of the module. The module also includes a fiber optic harness having the fiber pigtail and a plurality of optical fibers that exit the module for splicing to the optical network. A portion of the optical fibers of the fiber pigtail are disposed within a portion of a protective tube and includes a strain-relief assembly for attachment to the module for inhibiting pulling forces from being transferred into the module. The plurality of optical fibers of the fiber pigtail exit the second side of the main body of the module and the strain-relief assembly is used securing the plurality of optical fibers and the protective tube to the main body of the module. The strain-relief assembly has a first heat shrink for securing a plurality of strength members with the plurality of optical fibers and a second heat shrink for securing the plurality of strength members and the protective tube to a retention body of the strain-relief assembly, thereby providing strain-relief.

Still another embodiment of the disclosure is directed to a fiber optic module assembly having a fiber pigtail exiting the module. The fiber optic module assembly including a main body of the module defining an internal chamber disposed between a first side and a second side and a plurality of fiber optic components such as fiber optic connectors/adapters disposed at the first side of the module. A fiber optic harness includes the fiber pigtail and has a plurality of optical fibers of fiber pigtail that exit the module for splicing to the optical network. A portion of the optical fibers of the fiber pigtail are disposed within a portion of a protective tube and includes a strain-relief assembly for attachment to the module for inhibiting pulling forces from being transferred into the module. The plurality of optical fibers of the fiber pigtail exit the second side of the main body of the module and the strain-relief assembly is used for securing the plurality of optical fibers and the protective tube to the main body of the module. In this embodiment, the strain-relief assembly has a first heat shrink for securing the plurality of optical fibers to a fiber pass-through and a second heat shrink for securing the fiber pass-through and plurality of optical fibers to a boot.

The disclosure is also directed to methods of making a fiber optic module assembly having a fiber pigtail exiting the module. One method of making includes providing a module having a main body defining an internal chamber disposed between a first side and a second side and a plurality of fiber optic components disposed at the first side of the module, and providing a fiber optic harness including the fiber pigtail having a plurality of optical fibers, a portion of the plurality of optical fibers disposed within a portion of a protective tube and including a strain-relief assembly, the plurality of optical fibers exiting the second side of the main body of the module and the strain-relief assembly securing the plurality of optical fibers and the protective tube to the main body of the module. The method can further including the step of providing a boot that is secured to the main body of the module or providing the strain-relief assembly with a first heat shrink and a second heat shrink. Further, the method may include providing a plurality of strength members within a portion of the protective tube as desired.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION OF THE PREFERRED EMBODIMENTS

Reference will now be made in detail to the preferred embodiments of the disclosure, examples of which are illustrated in the accompanying drawings. Whenever possible, like reference numbers will be used to refer to like components or parts.

The optical modules and/or assemblies described herein are suitable for making optical interconnections for a variety of environments such as data center applications. The concepts of the disclosure are directed to optical modules having fiber pigtail exiting the module for direct connection to a plurality of complementary optical fibers of the optical network such as by fusion splicing. Conventional optical modules use a connector port (e.g., an adapter for receiving fiber optic connectors) at a wall of the module for making an optical connection into the module; however, this type of optical connection creates another connector-based optical loss junction. On the other hand, optical modules having fiber pigtails that include optical fibers that exit the module and can be spliced to counterpart optical fibers of a cable with a lower-loss connection. In other words, the connection loss of the spliced optical fibers is much lower than the connection loss between connectors, thereby taking less of the available optical power budget. The optical modules disclosed herein advantageously provide strain relief to the optical fibers in the pigtail assembly for maintaining optical performance and/or inhibiting damage to the pigtail assembly by inhibiting the transfer of pulling forces into the module. Reference will now be made in detail to the preferred embodiments, examples of which are illustrated in the accompanying drawings. Whenever possible, like reference numbers will be used to refer to like components or parts.

The fiber pigtail that exits the module typically is a fiber optic ribbon (hereinafter "ribbon") such as shown and described herein, but the concepts disclosed may be used with other fiber configurations such as loose fibers. Fiber optic ribbons are advantageous since they may be quickly and easily mass-fusion spliced with a complementary fiber optic ribbon, thereby making the optical connection. Generally speaking, the concepts disclosed herein provide protection for the ribbon (i.e., the fiber pigtail outside the module such as during installation and handling by using a protective tube to protect the same. Additionally, the protective tube needs to be secured to the ribbon to inhibit movement therebetween and the protective tube is then attached to a strain relief boot for inhibiting pulling forces on the ribbon from being transferred into the module. In other words, securing the ribbon of the fiber pigtail to the protective tube inhibits the ribbon from coming out of the protective tube, and attaching the protective tube to the strain-relief boot inhibits movement of the protective tube with respect to the strain-relief boot. Consequently, embodiments disclosed herein use cable preparations that inhibit movement among the strain-relief boot, the protective tube and the ribbon while providing a reliable protection during product handling such as installation and in use.

Figure 1:
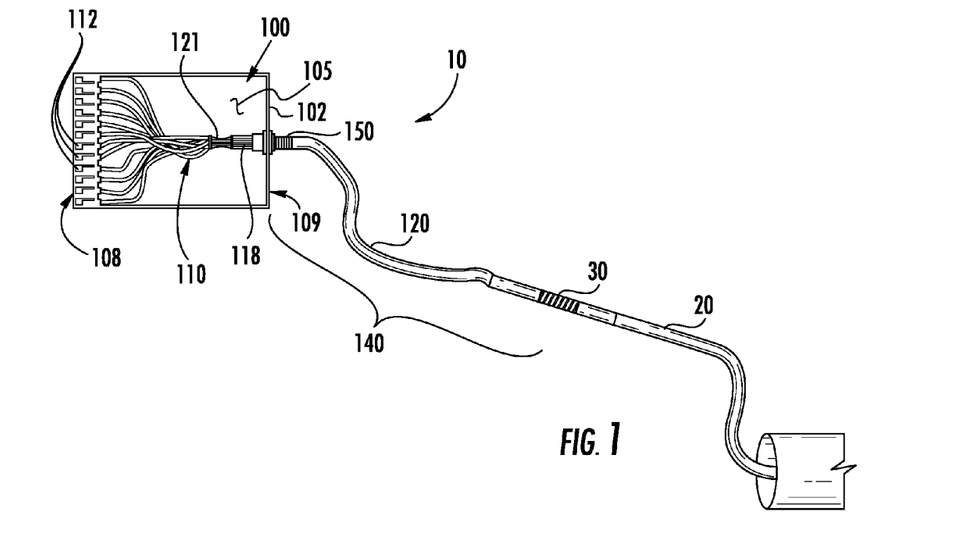
FIG. 1 is schematic representation of a portion of an optical system having a pigtail module.

FIG. 1 is schematically depicts of a portion of an optical system 10 having a fiber optic module 100 with a fiber optic harness 110. Fiber optic module 100 includes a main body 102 defining an internal chamber 105 disposed between a first side 108 and a second side 109 with one or more front openings (not visible) disposed at the first side having a plurality of fiber optic components 112 such as adapters that receive optical connectors on each end disposed through the one or more front openings. A cover of fiber optic module (not shown) is removed for explanatory purposes to show the arrangement of the fiber optic harness 110 inside the module 100. Fiber optic harness 110 includes a fiber pigtail 140 that exits a main body 102 of fiber optic module 100 and is optically attached to optical fibers of a trunk cable 20 at a splice point 30. As shown, fiber pigtail 140 includes a protective tube 120 disposed over a portion of a ribbon 118 that extends from a main body 102. Ribbon 118 is typically split into individual optical fibers inside the module 100 for attachment to fiber optical connectors that are received in adapters that are disposed on the first side 108 as known in the art. Ribbon 118 is secured to protective tube 120 for inhibiting movement therebetween as disclosed herein. Likewise, protective tube 120 is secured to the strain-relief boot 150 for inhibiting movement therebetween as discussed.

As shown in FIG. 1, fiber optic harness 110 is furcated from ribbon 118 into smaller groups of optical fibers within the internal chamber 105 of module 100. By way of example, the optical fibers of ribbon 118 are furcated into individual optical fibers on the left-side (i.e., within the module) of fiber pass-through 121. Thereafter, the individual optical fibers are attached to a fiber optic connector such as LC or SC connector or other similar component. The connectors are received in fiber optic components 112 such as a duplex adapters attached at the first side 108 of module 100. Consequently, the first side 108 of module 100 is a patch panel allowing the end user to make optical connections and reconfigure the optical connections as desired. Moreover, module 100 may be mounted in a housing or shelf that is secured in an equipment rack or the like as desired.

Figure 2:
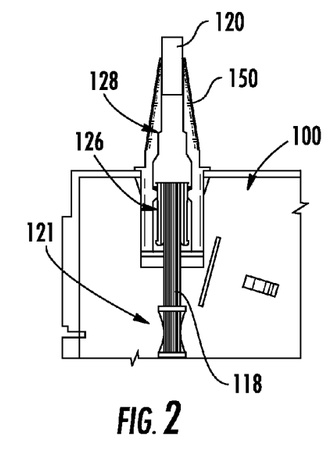
FIG. 2 is a partial schematic cross-sectional view showing a first strain relief construction for the fiber optic module of FIG. 1.

FIG. 2 is a partial schematic cross-sectional view showing a first strain relief construction for the fiber optic module 100 of FIG. 1. Specifically, FIG. 2 shows a first configuration of a portion of the fiber optic harness 110 for securing the fiber optic harness 110 to the main body 102 of fiber optic module 100 and allowing the fiber pigtail 140 to exit the second side 109 of module 100 along with boot 150. Boot 150 provides strain relief and inhibits side pulling forces from causing optical attenuation issues and the like. Fiber optic harness 110 includes a plurality of optical fibers having a portion within protective tube 120 after exiting module 100 along with a strain-relief assembly for securing the plurality of optical fibers and the protective tube 120 to the main body 102 of module 100. Simply stated, the strain relief assembly (not numbered) inhibits pulling forces on the fiber pigtail 140 from transferring forces into the module and causing optical attenuation issues.

Figure 3:
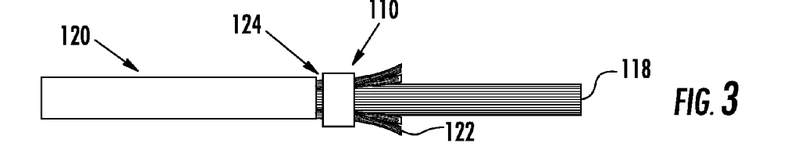
FIGS. 3-7 depict a first fiber optic harness having a pigtail assembly being prepared for use in the first strain relief construction of FIG. 2.
Figure 4:
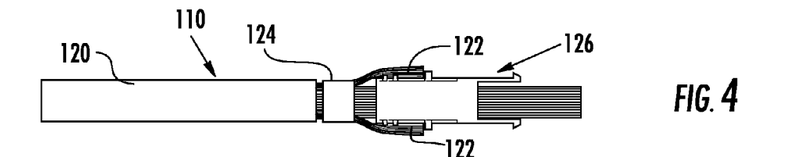
Figure 5:
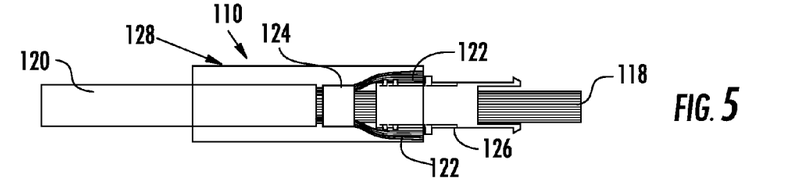
Figure 6:
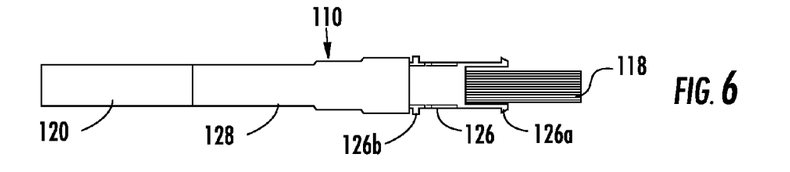
Figure 7:
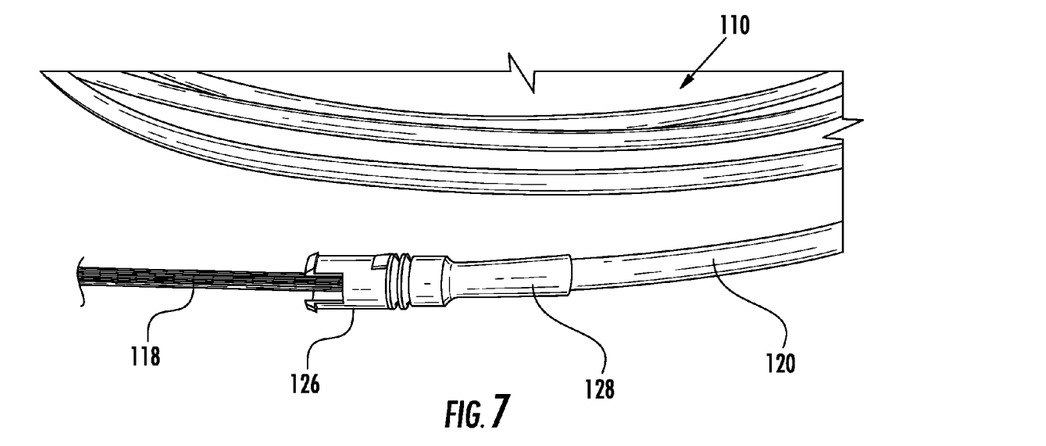

The first configuration of the strain relief assembly for the fiber optic harness 110 is shown in FIGS. 3-7. Specifically, FIGS. 3-7 show the first configuration of fiber optic harness 110 with the fiber pigtail being prepared for use in the fiber optic module assembly. This embodiment may use a fiber optic cable having strength members for creating a portion of the fiber optic harness 110 if desired. Fiber harness 110 with pigtail assembly 140 has protective tube 120 for covering the ribbon 118 exiting the module 100. FIG. 3 shows a portion of the protective tube 120 removed and a portion of the plurality of strength members 122 exposed beyond the protective tube 120. For instance, the strength members 122 such as Kevlar® or like has about 25 millimeters or so extending beyond the protective tube 120. Simply stated, a long enough portion of the strength members 122 are exposed so that the strength members may be secured to the optical fibers of ribbon 118 as shown. Simply stated, a portion of the strength members 122 are attached to the ribbon 118 using a first heat shrink 124, thereby securing the optical fibers with the strength members (i.e., the optical fibers of the ribbon and the strength members are coupled together). Next, a retention body 126 is threaded onto the optical fibers of ribbon 118 and the strength members 122 are fanned-out about a rear portion of the retention body 126 as depicted in FIG. 4. Afterwards a larger second heat shrink 128 is positioned about a portion of the retention body 126 and strength members 122 and behind a flange 126b, a portion of ribbon 118, first heat shrink 124, and protective tube 120 as shown in FIG. 5. Additionally, FIG. 5 depicts second heat shrink 128 as translucent so that the structure underneath is visible in the drawing for the purposes of clarity. When the second heat shrink 128 is secured in place it secures the strength members 122 and the protective tube 120 to retention body 126. Consequently, the ribbon 118 (i.e., optical fibers) and the protective tube 120 are inhibited from moving with respect to the retention body 126, thereby forming the strain-relief assembly of the fiber optic harness as shown in FIGS. 6 and 7. In other words, the ribbon 118 is inhibited from moving relative to the protective tube 120 and the strength members 122.

The front end of retention body 126 may also include structure such as protrusions or the like for securing the same with boot 150 (FIGS. 8-10) such as shown in FIG. 2. Likewise, boot 150 may have complimentary geometry for receiving the protrusion of the retention body 126 and securing the same such as waist portion 150c. In other words, the pigtail end of fiber optic harness 110 is threaded into the strain relief boot 150 until reaching retention body 126 where the retention body 126 can snap or friction fit into position so that it can transfer forces to the boot 150. Simply stated, the retention body 126 is secured by two protrusions that interface with complimentary geometry inside the boot and along with its conical shape passageway that helps inhibit movement therebetween. Thereafter, the fiber optic harness 110 may be secured to the module 100 using boot 150 such as shown in detailed view of FIG. 8. In other words, the fiber optic harness 110 is threaded into the module 100 until the boot 150 is seated at the proper location. The optical fibers may also be routed into an optional fiber pass-through 121 for routing or the like inside the module. The fiber pass-through 121 may be made of any suitable material such as an ethylene-vinyl acetate (EVA); however, other materials are possible.

Figure 8:
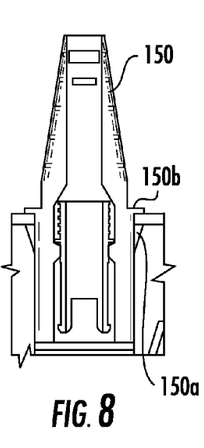
FIGS. 8-10 depict further details of the strain body and strain-relief boot used in the first strain relief construction.
Figures 9, 10:
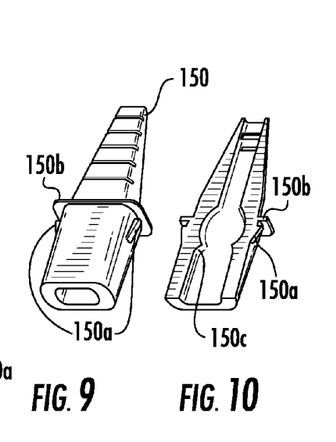

The details of boot 150 are best shown in FIGS. 9 and 10. As depicted, boot 150 includes one or more latches 150a and collar 150b. Thus, the strain relief assembly of fiber optic harness 110 may be secured to the module 100 by way of boot 150 for inhibiting forces from being transferred from the pigtail end of the harness into module 100. Resilient arms (not numbered) of retention body 126 may include latches 126a or other structure such as one or more protrusions for securing the same with the boot 150 as shown in FIG. 8.

Figure 11:
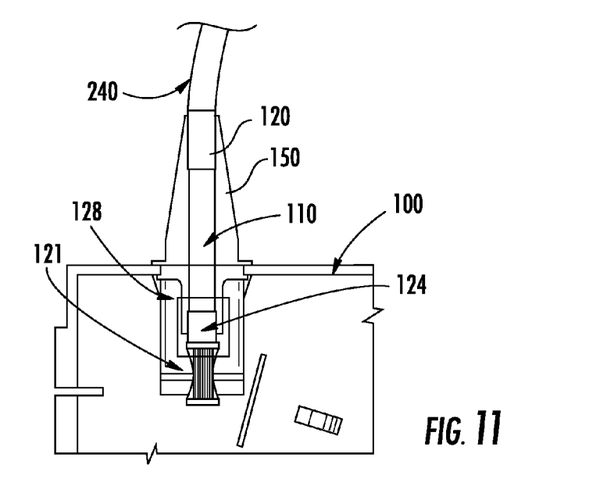
FIG. 11 is a cross-sectional view showing a second strain relief construction for the fiber optic module of FIG. 1.

Other constructions for the strain-relief assembly portion of the fiber optic harness 110 are also possible. By way of example, FIG. 11 depicts a partial cross-sectional view showing a second strain relief construction for the fiber optic module of FIG. 1. In this embodiment, the fiber optic harness 110 does not include strength members, but still uses a first and second heat shrink as discussed below.

Figure 12:
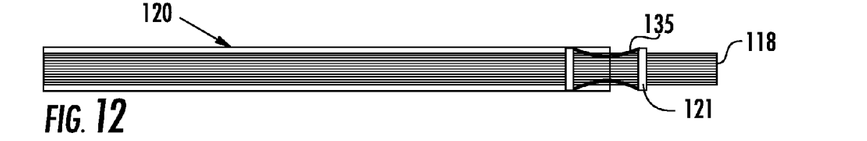
FIGS. 12-17 depict a second fiber optic harness having a pigtail assembly being prepared for use in the second strain relief construction of FIG. 11.
Figure 13:
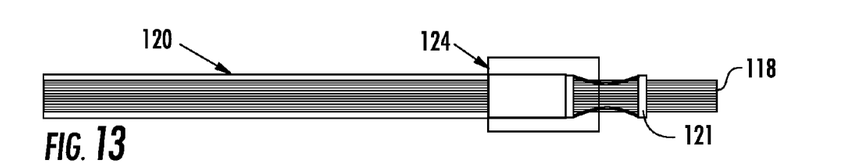
Figure 14:
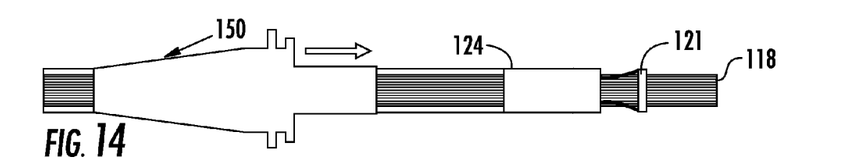
Figure 15:
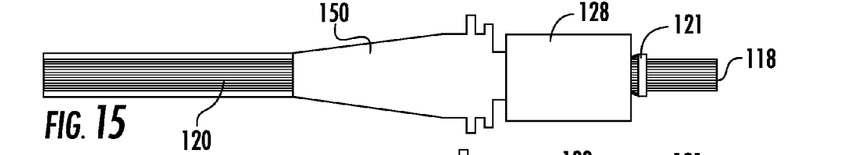
Figure 16:
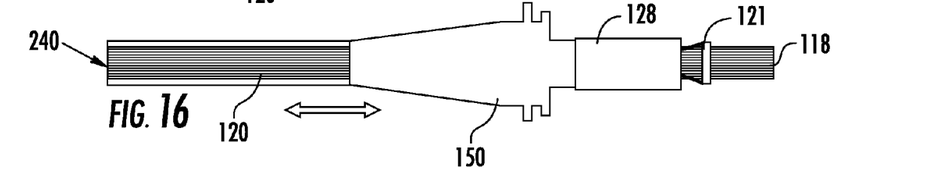
Figure 17:
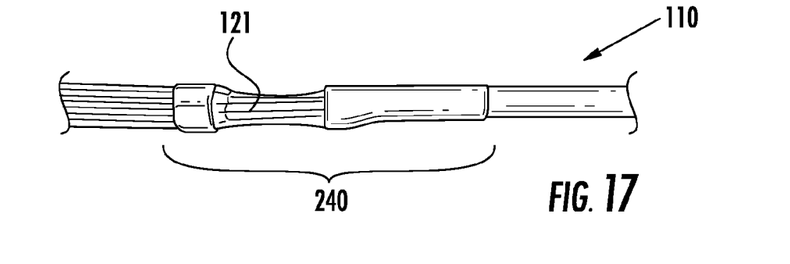
Figure 18:
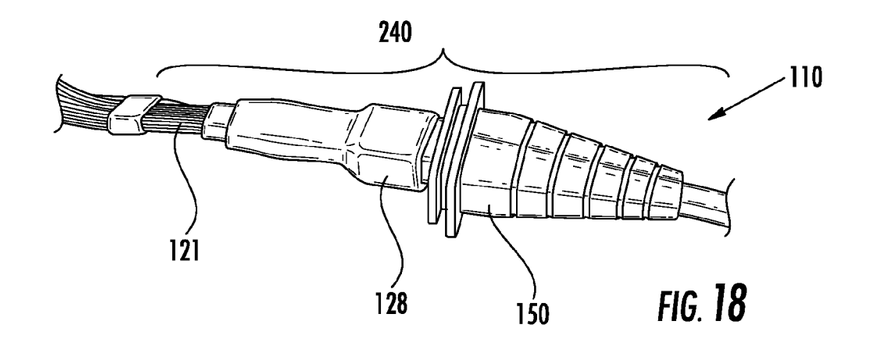
FIG. 18 is a perspective view of a portion of the fiber optic harness having the pigtail assembly.
Figure 19:
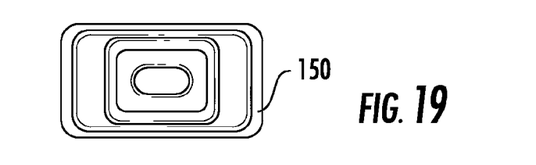
FIGS. 19 and 20 depict further details of a strain-relief boot for the second strain relief construction.
Figure 20:
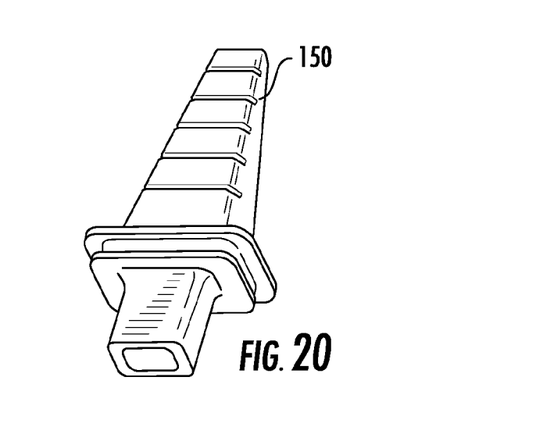

FIGS. 12-18 depict a second fiber optic harness having a pigtail assembly being prepared for use in the second strain relief construction shown in FIG. 11. The second strain relief construction uses a fiber harness 110 having a pigtail assembly 240 with protective tube 120 covering the ribbon 118 exiting the module 100 as shown in FIG. 11. As shown in FIGS. 12 and 13, protective tube 120 (shown as transparent so internal details are visible) is attached to the fiber pass-through 121 by using the first heat shrink 124 (also shown as transparent so internal construction is visible). Protective tube 120 has an end adjacent to the pass-through 121 slit on the sides so that it fits over the fiber pass-through 121 about half-way as depicted. Then the first heat shrink 124 is positioned and secured over a portion of the fiber pass-through 121 and protective tube 120, thereby inhibiting movement of the ribbon 118 relative to the fiber pass-through 121 as shown. In other words, the first heat shrink 124 secures the plurality of optical fibers of the ribbon 118 to the fiber pass-through 121. Fiber pass-through 121 may be formed from an EVA, but any suitable material is possible for the fiber pass-through 121. The pigtail end of the cable is then threaded over boot 150 as represented by the arrow to cover a portion of the first heat shrink 124. Thereafter, a second heat shrink 128 is threaded onto the other end of the fiber optic harness 110 so it covers a portion of fiber pass-through 121, the first heat shrink 124, and a portion of boot 150 as best shown in FIG. 15. After securing the second heat shrink 128, the fiber pass-through 121 and the optical fibers are secured to the strain relief boot 150 for inhibiting fiber movement to isolate forces from acting on the fibers within the module 100 as depicted in FIG. 16. In other words, the ribbon 118 is inhibited from moving relative to the protective tube 120, fiber pass-through 121, and strain relief boot 150. FIG. 17 shows a perspective view of a portion of the fiber optic harness having a partial fiber pigtail assembly 240 without the boot 150 and second heat shrink 128 being attached. FIG. 18 shows a detailed view of a portion of the fiber optic harness having a completed strain relief assembly 240 that includes boot 150 and second heat shrink 128. After completing the pigtail harness, the strain relief boot 150 may then be attached to the module via the double flanges (not numbered) located on boot 150; however, other structures are possible for securing the boot/strain relief assembly as desired. FIGS. 19 and 20 depict further details of a strain-relief boot 150 for the second strain relief construction.

The disclosure is also directed to methods of making a fiber optic module assembly having a fiber pigtail exiting the module. One method of making includes providing a module having a main body defining an internal chamber disposed between a first side and a second side and a plurality of fiber optic components disposed at the first side of the module, and providing a fiber optic harness including the fiber pigtail having a plurality of optical fibers, a portion of the plurality of optical fibers disposed within a portion of a protective tube and including a strain-relief assembly, the plurality of optical fibers exiting the second side of the main body of the module and the strain-relief assembly securing the plurality of optical fibers and the protective tube to the main body of the module. The method can further including the step of providing a boot that is secured to the main body of the module or providing the strain-relief assembly with a first heat shrink and a second heat shrink. Further, the method may include providing a plurality of strength members within a portion of the protective tube. The method may include the strain-relief assembly further including a retention body disposed within a boot. In further methods, the strain-relief assembly has a first heat shrink for securing a plurality of strength members with the plurality of optical fibers and a second heat shrink for securing the plurality of strength members and the protective tube to a retention body of the strain-relief assembly. And alternative methods, may include the strain-relief assembly having a first heat shrink for securing the plurality of optical fibers to a fiber pass-through and a second heat shrink for securing the fiber pass-through and plurality of optical fibers to a boot.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

We claim:

1. A fiber optic module assembly having a fiber pigtail exiting module, the assembly comprising:
    a main body of the module defining an internal chamber disposed between a first side and a second side;
    a plurality of fiber optic components disposed at the first side of the module; and
    a fiber optic harness including the fiber pigtail and a plurality of optical fibers within a portion of a protective tube and a strain-relief assembly, the strain relief assembly including a first heat shrink and a second heat shrink, the plurality of optical fibers exiting the second side of the main body of the module and the strain-relief assembly securing the plurality of optical fibers and the protective tube to the main body of the module.

2. The fiber optic module of claim 1, further including a boot, wherein the boot is secured to the main body.

3. The fiber optic module of claim 1, further including a plurality of strength members within a portion of the protective tube.

4. The fiber optic module of claim 1, the strain-relief assembly further including a retention body disposed within a boot.

5. The fiber optic module of claim 1, the strain-relief assembly having a first heat shrink for securing a plurality of strength members with the plurality of optical fibers and a second heat shrink for securing the plurality of strength members and the protective tube to a retention body of the strain-relief assembly.

6. The fiber optic module of claim 1, the strain-relief assembly having a first heat shrink for securing the plurality of optical fibers to a fiber pass-through and a second heat shrink for securing the fiber pass-through and plurality of optical fibers to a boot.

7. A fiber optic module assembly having a fiber pigtail exiting the module, the assembly comprising:
    a main body of the module defining an internal chamber disposed between a first side and a second side;
    a plurality of fiber optic components disposed at the first side of the module; and
    a fiber optic harness including the fiber pigtail having a plurality of optical fibers with a portion of the plurality of optical fibers disposed within a protective tube and including a strain-relief assembly, the plurality of optical fibers exiting the second side of the main body of the module and the strain-relief assembly securing the plurality of optical fibers and the protective tube to the main body of the module, wherein the strain-relief assembly has a first heat shrink for securing a plurality of strength members with the plurality of optical fibers and a second heat shrink for securing the plurality of strength members and the protective tube to a retention body of the strain-relief assembly.

8. A fiber optic module assembly having a fiber pigtail exiting the module, the assembly comprising:
    a main body of the module defining an internal chamber disposed between a first side and a second side;
    a plurality of fiber optic components disposed at the first side of the module; and
    a fiber optic harness including the fiber pigtail having a plurality of optical fibers with a portion of the plurality of optical fibers being disposed within a portion of a protective tube and including a strain-relief assembly, the plurality of optical fibers exiting the second side of the main body of the module and the strain-relief assembly securing the plurality of optical fibers and the protective tube to the main body of the module, wherein the strain-relief assembly has a first heat shrink for securing the plurality of optical fibers to a fiber pass-through and a second heat shrink for securing the fiber pass-through and plurality of optical fibers to a boot.

9. A method of making a fiber optic module assembly having a fiber pigtail exiting module, including the steps of:
    providing a module having a main body defining an internal chamber disposed between a first side and a second side and a plurality of fiber optic components disposed at the first side of the module; and
    providing a fiber optic harness including the fiber pigtail having a plurality of optical fibers, a portion of the plurality of optical fibers disposed within a portion of a protective tube and including a strain-relief assembly, the strain relief assembly including a first heat shrink and a second heat shrink, the plurality of optical fibers exiting the second side of the main body of the module and the strain-relief assembly securing the plurality of optical fibers and the protective tube to the main body of the module.

10. The method of claim 9, further including the step of providing a boot, wherein the boot is secured to the main body.

11. The method of claim 9, further including providing a plurality of strength members within a portion of the protective tube.

12. The method of claim 9, the strain-relief assembly further including providing a retention body disposed within a boot.

13. The method of claim 9, the strain-relief assembly having a first heat shrink for securing a plurality of strength members with the plurality of optical fibers and a second heat shrink for securing the plurality of strength members and the protective tube to a retention body of the strain-relief assembly.

14. The method of claim 9, the strain-relief assembly having a first heat shrink for securing the plurality of optical fibers to a fiber pass-through and a second heat shrink for securing the fiber pass-through and plurality of optical fibers to a boot.

* * * * *